United States Patent [19]

VanVoorhies et al.

[11] Patent Number: 5,100,172
[45] Date of Patent: Mar. 31, 1992

[54] INFLATOR MODULE

[75] Inventors: Kurt L. VanVoorhies, Morgantown, W. Va.; Donald J. Mecsey, Sterling Heights, Mich.

[73] Assignee: Automotive Systems Laboratory, Inc., Farmington Hills, Mich.

[21] Appl. No.: 684,239

[22] Filed: Apr. 12, 1991

[51] Int. Cl.⁵ .............................................. B60R 21/30
[52] U.S. Cl. ..................................... 280/738; 280/739
[58] Field of Search ............... 280/728, 738, 739, 742, 280/743

[56] References Cited

U.S. PATENT DOCUMENTS

| | | | |
|---|---|---|---|
| 3,843,152 | 10/1974 | Nonaka | 280/739 X |
| 3,910,595 | 10/1975 | Katter et al. | 280/738 X |
| 4,500,114 | 2/1985 | Grey, Jr. | 280/738 X |
| 4,928,991 | 5/1990 | Thorn | 280/738 |
| 5,016,913 | 5/1991 | Nakajima et al. | 280/743 X |

Primary Examiner—Robert P. Olszewski
Assistant Examiner—Tuan N. Nguyen
Attorney, Agent, or Firm—Lyon & Delevie

[57] ABSTRACT

An airbag inflator comprises a housing having a frontal opening for the deployment of an airbag and a plurality of air aspirating and exhaust ports in the sidewalls thereof. An airbag is folded into the housing so as to overlie and close the ports in the sidewalls thereof. The airbag covers the ports in the housing during initial deployment of the airbag but subsequent deployment of the airbag opening the ports to first permit aspiration of the air into the housing and subsequently permit exhaust of air outwardly of the housing.

3 Claims, 2 Drawing Sheets

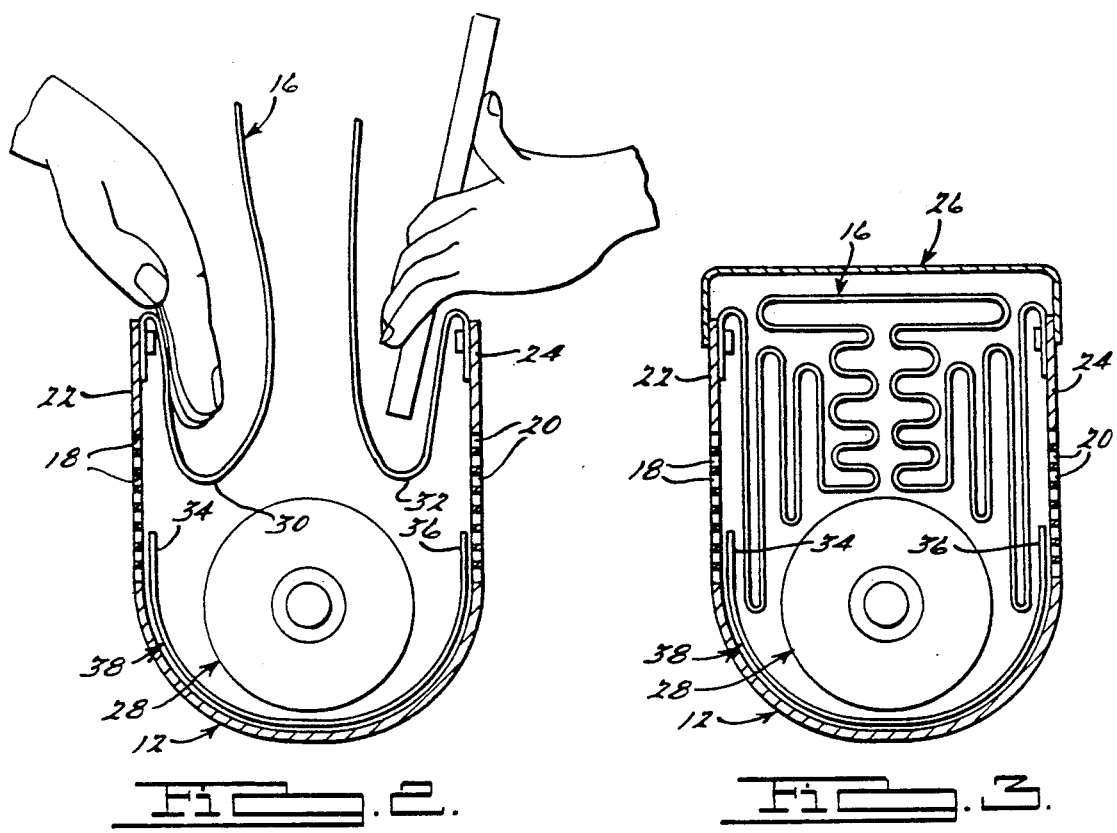
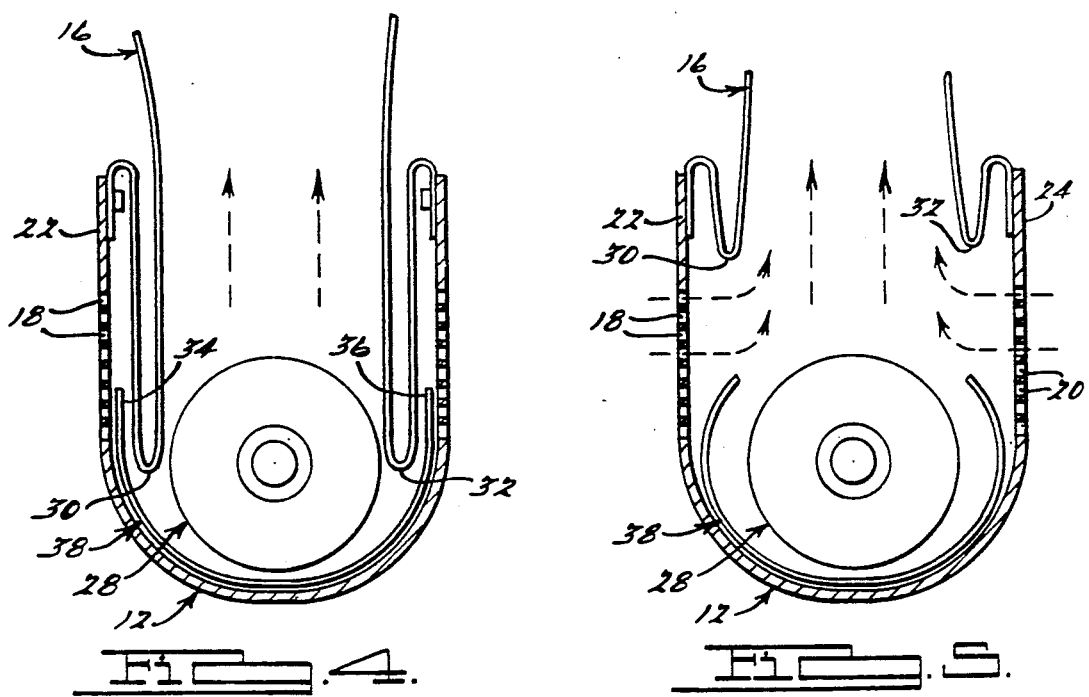

INFLATOR MODULE

BACKGROUND OF THE INVENTION

An inflatable restraint system protects a vehicle occupant in the event of a crash by dissipating energy in a manner that limits occupant impact to a noninjurious level. This is essentially a process wherein an airbag is first deployed, subsequently fully inflated to a given pressure within a given time, thence deflated, thereby to restrain the occupant who simultaneously moves forward into the inflated airbag.

A problem, to which the present invention presents a solution, is that the occupant's motion into the airbag causes a reduction in airbag volume, resulting in pressure buildup in the airbag. This pressure must be relieved by venting gases from the airbag in order to preclude injury to the vehicle occupant.

More specifically, the point in time where occupant deceleration begins to increase is termed the initiation of restraint, and the period from this time to the point of maximum chest penetration into the airbag is termed the duration of restraint. It is desirable to time the initiation of restraint to occur as soon as possilbe after impact, and to make the duration of restraint as long as possible, in order to minimize acceleration and load on the occupant.

Venting of the gases in the airbag is important in that if the gases are not vented properly, the airbag acts like a spring to forcefully propel the occupant rearwardly into the seat. In the worst case, with no venting, the airbag acts like a spring to store the occupant's relative kinetic energy derived from occupant deceleration relative to the vehicle and the energy is returned to the occupant by accelerating the occupant rearwardly. Theoretically, if the airbag functions as a perfect spring, the occupant would be accelerated rearwardly at a speed equivalent to the initial speed of the car, which in turn places the occupant at risk of injury when impacting the seat.

Accordingly, a fundametal design criteria for an airbag system is that the system maximize absorption of the occupant's kinetic energy. Thus, while airbag ventilation is an important factor in mitigating injury to the occupant in an airbag system, ventilation must strike a balance between two extremes, both of which are undesirable. Excessive venting, allows the occupant to penetrate too deeply into the bag and risks injury due to contact with the vehicle instrument panel or windshield. On the other hand, insufficient venting results in an airbag that is too stiff, causing excessive loads to the neck, excessive accelerations to the head and chest, and excessive occupant rebound energy.

Ideal restraint system performance depends upon whether the inflator module is principally a sink or a source of energy to the occupant. Normally, the inflator module acts as a sink for occupant energy. For a normally seated adult in a dynamic crash, the occupant has significant momentum upon contact with the airbag. In this case, the airbag should be inflated as quickly as possible so as to initiate restraint as soon as possible, and the inflation and venting thereafter should be adjusted to allow for the maximum depth of penetration and/or the maximum duration of restraint.

In the case of an out-of-position occupant, the inflator module acts as a source of energy to the occupant. The goal is to soften the acceleration to the occupant by coordination of the shape of gas generator pressurization curve and venting. The deployment door design also has a strong influence on system performance with out-of-position occupants in that it can act to deflect the airbag around the occupant, or can provide a moderating inertial element between the airbag and the occupant, which reduces loads to the occupant.

Prior art teachings, for example Japanese Publication document 2-115747, describe the use of duct venting in conjunction with a non-aspirating inflator. Such a known, relatively large venting duct instantaneously vents gases from within the airbag and inflator housing, creating the potential for occupant impact with, for example, the instrument panel. Moreover, the size and location of the vent renders it incapable of aspirating ambient air into the airbag in a timely manner to augment the pumping ratio of the inflator. Thus, while said prior art venting duct may exhibit the desirable attribute of venting gases from the airbag, it fails to contemplate or solve the problem of venting in a manner that is correlated to the timing of impact of a vehicle occupant with the airbag.

Yet another factor to be considered in vent design is that the gas generators used in airbag inflators generally also create undesirable particulate byproducts, which must be filtered from the exhaust stream. The particulates are classified as either respirable or nonrespirable depending upon their size, with the small respirable particles being of greater concern. These particles would be admitted to the passenger compartment more readily via an airbag vent system than a duct vent system, since in the later system, the vented gases are directed behind the instrument panel where there are additional opportunities for the particulates to be removed by absorption or basic mechanical filtering by the labyrinth of surfaces within the instrument panel behind the inflator.

Other characteristics of the generant gases may also have adverse physiological effects on people. The heat, or enthalpy of the exhaust stream has been reported to cause burns. This is more of a problem for direct inflators than for aspirating inflators due to the aspirator's inherent cooling effect.

Yet another factor to be considered is that with a direct inflator, all of the gas used to fill the airbag is pyrotechnically generated, at relatively high temperatures, whereas with an aspirating inflator, the pyrotechnically generated gases are augmented with inlet air at ambient temperature which is pumped into the inflator module by the aspirator. The relatively cool inlet air stream cools the relatively hot propellant gases, thus reducing their specific volume. Prior to airbag deployment, and thus prior to aspiration, the specific volume of the gases generated by direct and aspirating inflators would be equivalent. The aspirator has its highest instanteous pumping ratio at initial airbag deployment, and thereafter, the pumping ratio stabilizes to a relatively constant level, until the aspirator is stalled, at which time the inflator reverts to acting like a direct firing inflator.

SUMMARY OF THE INVENTION

The aspirating inflator of the present invention augments gases generated by a pyrotechnic device with air pumped in through air passages in the inflator module housing. In the first stage of the process, the hot pyrotechnically generated gases pressurize the inflator module duct behind the packed airbag. The pressurized gases force the deployment door which covers the inflator module to break, allowing the packed airbag to deploy. The deploying airbag acts as a piston to aspirate air through inlet holes in the inflator module. The nozzles in the pyrotechnic gas generator are oriented to direct the gas stream so as to create a vacuum at the location of the aspirating air inlets at the rear of the duct inducing flow of ambient air therethrough. The high velocity jet stream also exchanges momentum with the inlet air molecules, directing them into the airbag, and thus completing the pumping process.

The aspirator continues to pump air until it reaches its stall pressure, due to occupant impact with the airbag or filling of the airbag. The present invention contemplates and solves the problem of controlled venting of the airbag whereby both a large occupant who has a tendency to stall the aspirator earlier than a small occupant, and a small occupant who may not cause stall earlier than stall caused by normal filling of the airbag are both protected.

Set in the above context, the object of the present invention is (1) an improved means of venting gas from an airbag in order to maximize absorption of occupant energy; (2) means to vent gas safely away from a vehicle occupant so that the occupant is not burned or otherwise injured; (3) an improvement in the efficiency of the airbag inflation process; (4) to reduce the cost of the inflator module assembly by eliminating the requirement for complex check valves; (5) to eliminate the operation of cutting and reinforcing vent holes in the airbag, thereby enabling less expensive coated fabrics to be utilized; (6) to reduce the size of the inflator module assembly by virtue of the improved packing efficiency of a coated air bag assembly; and (7) to enable gas generant formulations to be used which produce relatively hot exhaust gases and/or exhaust gases with steam or other potentially physically hazardous constituents to be safely used in a corresponding inflator module assembly.

The present invention maximizes the efficiency of (a) pressure buildup in the module assembly in order to overcome the inertia of the airbag, (b) deployment of the airbag from the inflator module housing, and (c) venting of the airbag. The aforesaid objects are accomplished by a novel housing configuration which, in conjunction with a novel method of packing the airbag, results in use of the airbag fabric as an inherent check valve to provide for aspiration during airbag deployment yet permit controlled outflow of gases subsequent to deployment.

BRIEF DESCRIPTION OF THE DRAWINGS

FIG. 3 is a cross-sectional view of the assembled inflator;

FIG. 4 is a cross-sectional view of the inflator at the first stage of airbag deployment;

FIG. 5 is a cross-sectional view at an intermediate stage of airbag deployment; and FIG. 6 is a cross-sectional view of the inflator at the onset of deflation.

DETAILED DESCRIPTION OF THE PREFERRED EMBODIMENT OF THE INVENTION

Figure 1:
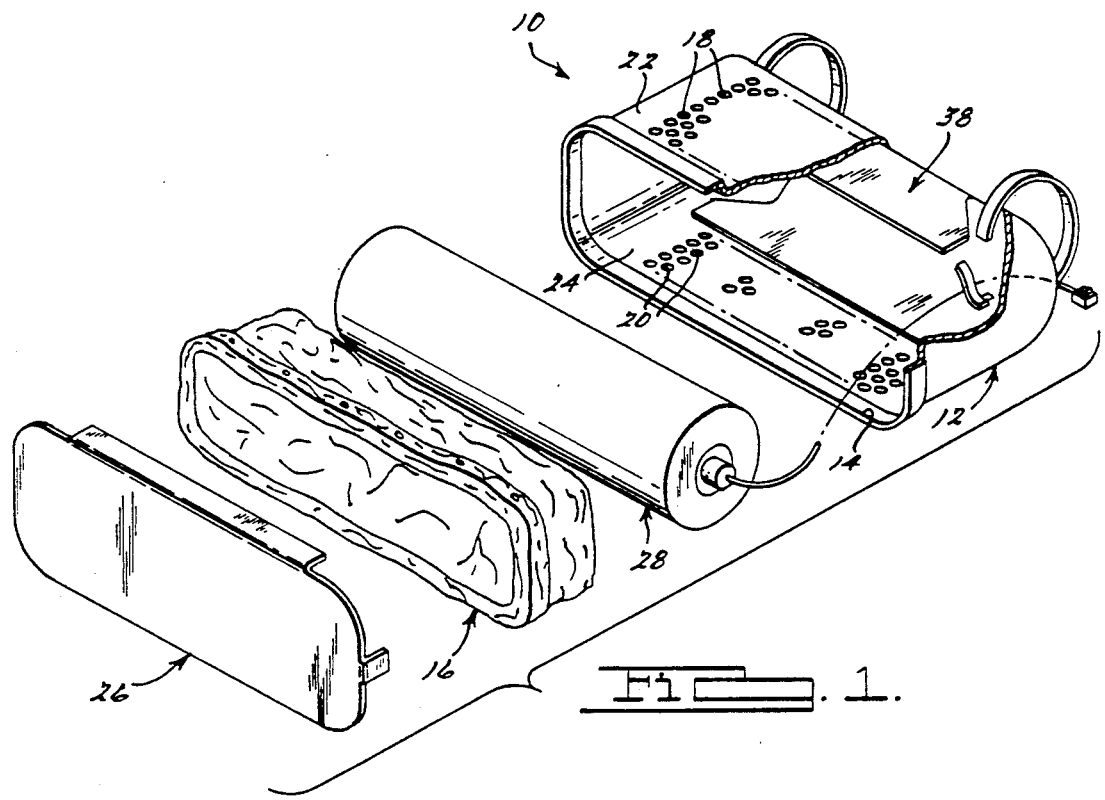
FIG. 1 is an exploded perspective view of the airbag inflator of the present invention.

As seen in FIG. 1 of the drawings, an inflator module 10 for a vehicle occupant restraint system comprises a housing 12 having a frontal opening 14 for the deployment of an airbag 16. The housing 12 has a plurality of apertures 18 and 20 in the sidewalls 22 and 24 thereof, respectively, for the aspiration and venting of gas as will be described.

The frontal opening 14 of the housing 12 is closed by a cover plate 26 that is either displaced from the frontal opening 14 or ruptured upon energization of the inflator module 10.

Inflation of the bag 16 is accomplished by gases from a conventional propellant canister 28. The canister 28 is located adjacent the rear of the inflator housing 12 for a reason to be discussed. The propellant in the canister 28 is energized by an electrical signal from a crash sensor or control module (not shown) upon rapid deceleration of a vehicle (not shown) in which the module 10 is disposed.

Figure 2:
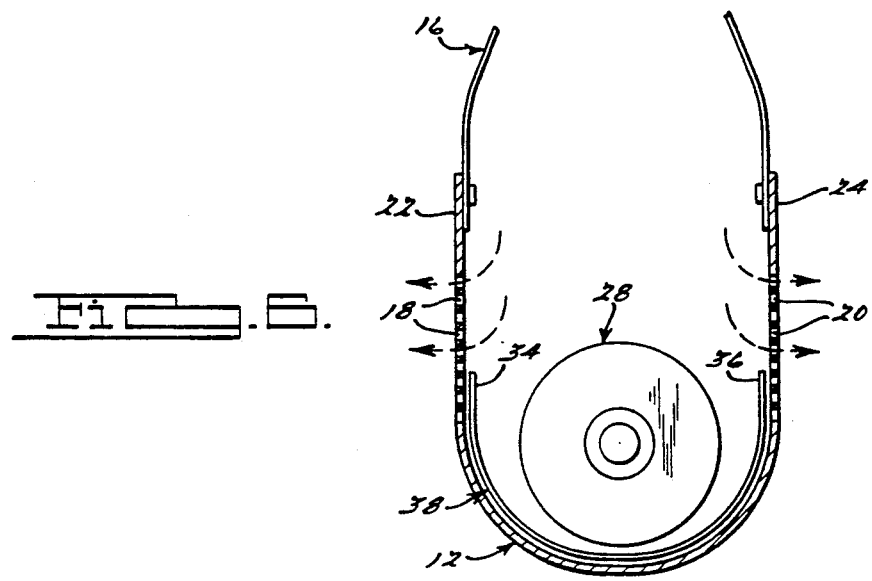
FIG. 2 is a view showing the first stage of folding the airbag into the inflator housing.

As seen in FIG. 2 of the drawings, lower end portions 30 and 32 of the airbag 16 initially tucked into position adjacent the sidewalls 22 and 24, respectively, of the housing 12. The lower end portions 30 and 32 of the airbag 16 overlap upper end portions 34 and 36 of a flap 38 which also covers the lower most apertures 18 and 20 in the walls 22 and 24, respectively. The end portions 30 and 32 of the airbag 16 overlap the upper end portions 34 and 36 of the flap 38 to insure against passage of gas outwardly of the housing 12 until such time as the end portions 30 and 32 of the airbag 16 are retracted from within the housing 12 due to inflation of the airbag 16.

As best seen in FIG. 3 of the drawings, the airbag 16 is reentrantly folded a number of times until it is fully installed within the housing 12. The major portion of the airbag 16 is disposed centrally thereof so as to be expelled from the housing 12 upon initial energization of the gas canister 28.

As seen in FIG. 4 of the drawings, the airbag 16 is at an initial stage of deployment, the central portion thereof having been deployed but the folded lower ends 30 and 32 still lying in overlapping relation to the end portions 34 and 36 of the flapper valve 38. Thus, at this point in the deployment cycle, gas from the canister 28 is fully utilized to expand and deploy the airbag 16, the apertures 18 and 20 in the sidewalls 22 and 24 of the housing 12 being effectively sealed so as to create a vertical gas flow path as seen in the drawings.

As seen in FIG. 5 of the drawings, the end portions 30 and 32 of the airbag 16 have been retracted from the housing 12 exposing the apertures 18 and 20 to the outside environment and conditioning the module 10 for aspiration of ambient air into the airbag 16. When this condition obtains, the upper end portions 34 and 36 of the flapper valve 38 deflect inwardly under the differential pressure induced by the established vertical gas flow past the apertures 18 and 20 thereby drawing ambient air through the apertures 18 and 20 and significantly increasing the pumping ratio of the module 10.

As seen in FIG. 6, the module 10 is in the deflation phase of its cycle. At this point in time only the apertures 18 and 20 above the end portions 34 and 36 of the flap 38 are open and free to vent gas produced by the gas canister 28 into the ambient environment surrounding the inflator module 10 thereby resulting in controlled deflation of the airbag.

From the foregoing it should be apparent that the instant invention applies to an aspirating inflator, wherein apertures in the walls of the inflator housing serve the dual purpose of both admitting and exhausting gases. Venting in accordance with the present invention does not require a discreet exhaust pipe. A synergy between aspiration and subsequent venting is created, the location and distribution of the holes being governed by both the aspiration and venting requirements of the inflator.

While the preferred embodiment of the invention has been disclosed, it should be appreciated that the invention is susceptible of modification without departing from the scope of the following claims.

I claim:

1. An airbag inflator comprising

A housing having a frontal opening for the deployment of an airbag and a plurality of dual purpose air aspirating and exhaust ports in the sidewalls thereof, an airbag secured to said housing about the frontal opening therein, said airbag being normally folded into said housing so as to overlie and close the ports in the sidewalls thereof, and means for generating a gas to deploy said airbag through the frontal opening in said housing, said airbag covering the ports in said housing during initial deployment of the airbag but subsequent deployment of said airbag opening said ports to first permit aspiration of air into said housing and subsequently permit exhaust of air outwardly of said housing.

2. An airbag inflator in accordance with claim 1 including a flapper valve in said housing initially controlled by said airbag for first precluding aspiration of air into said housing, thence subsequently precluding exhaust of gas out of said housing through some of said ports whereby a differential is achieved between the aspiration and venting of air.

3. An airbag inflator in accordance with claim 2 wherein said flapper valve automatically closes some of said ports upon flow of gas therethrough out of said housing.

* * * * *